United States Patent
Yokota et al.

(10) Patent No.: US 7,883,588 B2
(45) Date of Patent: *Feb. 8, 2011

(54) PB-FREE BEARING USED FOR FUEL-INJECTION PUMP

(75) Inventors: Hiromi Yokota, Aichi (JP); Daisuke Yoshitome, Aichi (JP); Hiroaki Hayakawa, Aichi (JP); Naruhiko Inayoshi, Aichi (JP); Youichi Murakami, Aichi (JP); Masashi Suzuki, Aichi (JP); Takahiro Nozu, Aichi (JP)

(73) Assignees: Taiho Kogyo Co., Ltd., Toyota-shi (JP); Denso Corporation, Kariya-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/148,186

(22) Filed: Jun. 9, 2005

(65) Prior Publication Data

US 2006/0000527 A1    Jan. 5, 2006

(30) Foreign Application Priority Data

Jun. 10, 2004   (JP)   ............................ 2004-172349

(51) Int. Cl.
*C22C 9/00* (2006.01)
*F16C 32/12* (2006.01)

(52) U.S. Cl. .................. 148/432; 148/433; 148/434; 148/435; 148/436; 420/472; 420/496; 420/499; 75/246; 384/276

(58) Field of Classification Search ......... 148/432–436; 420/472, 496, 499; 384/276; 75/246

See application file for complete search history.

(56) References Cited

U.S. PATENT DOCUMENTS 6,652,675 B2   11/2003   Sakai et al.

2001/0019779 A1   9/2001   Sakai et al.

(Continued)

FOREIGN PATENT DOCUMENTS

GB    2355016 A    4/2001

(Continued)

OTHER PUBLICATIONS

Pre-lecture Paper of Tribology Conference of Tribology Institute of Japan (Tokyo May 2003).

*Primary Examiner*—Sikyin Ip
(74) *Attorney, Agent, or Firm*—Birch, Stewart, Kolasch & Birch, LLP

(57) ABSTRACT

In a Cu—Bi based sintered alloy, to which hard particles, such as $Fe_3P$, are added, the main constituent components of the microstructure are a Cu matrix, Bi phase and the hard particles. In the sintering method of the present invention, the flow of the Bi phase is suppressed to as low level as possible. The novel structure is that the contact between the Bi phase and hard particles is kept to a low ratio. A lead-free bearing used for a fuel injection pump according to the present invention contains from 1 to 30 mass % of Bi and from 0.1 to 10 mass % of hard particles having from 10 to 50 μm of the average particle diameter, the balance being Cu and unavoidable impurities. The properties of the main component phases are utilized at a high level such that the sliding properties are equivalent to those of a Pb containing Cu-based sintered alloy.

10 Claims, 5 Drawing Sheets

U.S. PATENT DOCUMENTS

| | | |
|---|---|---|
| 2003/0064239 A1 | 4/2003 | Saitou et al. |
| 2008/0095658 A1 | 4/2008 | Yokota et al. |

FOREIGN PATENT DOCUMENTS

| | | |
|---|---|---|
| JP | 61-73849 A | 4/1986 |
| JP | 03-247732 A | 11/1991 |
| JP | 04-028836 A | 1/1992 |
| JP | 7-9046 B2 | 2/1995 |
| JP | 8-19945 B2 | 3/1996 |
| JP | 10-046272 A | 2/1998 |
| JP | 10-330868 A | 12/1998 |
| JP | 2001-081523 A | 3/2001 |
| JP | 2001-107106 A | 4/2001 |
| JP | 2001-220630 A | 8/2001 |
| JP | 2001-240925 A | 9/2001 |
| JP | 2002-12902 A | 1/2002 |
| JP | 3421724 B2 | 4/2003 |
| JP | 2005-200703 A | 7/2005 |
| JP | 2005-350722 A | 12/2005 |

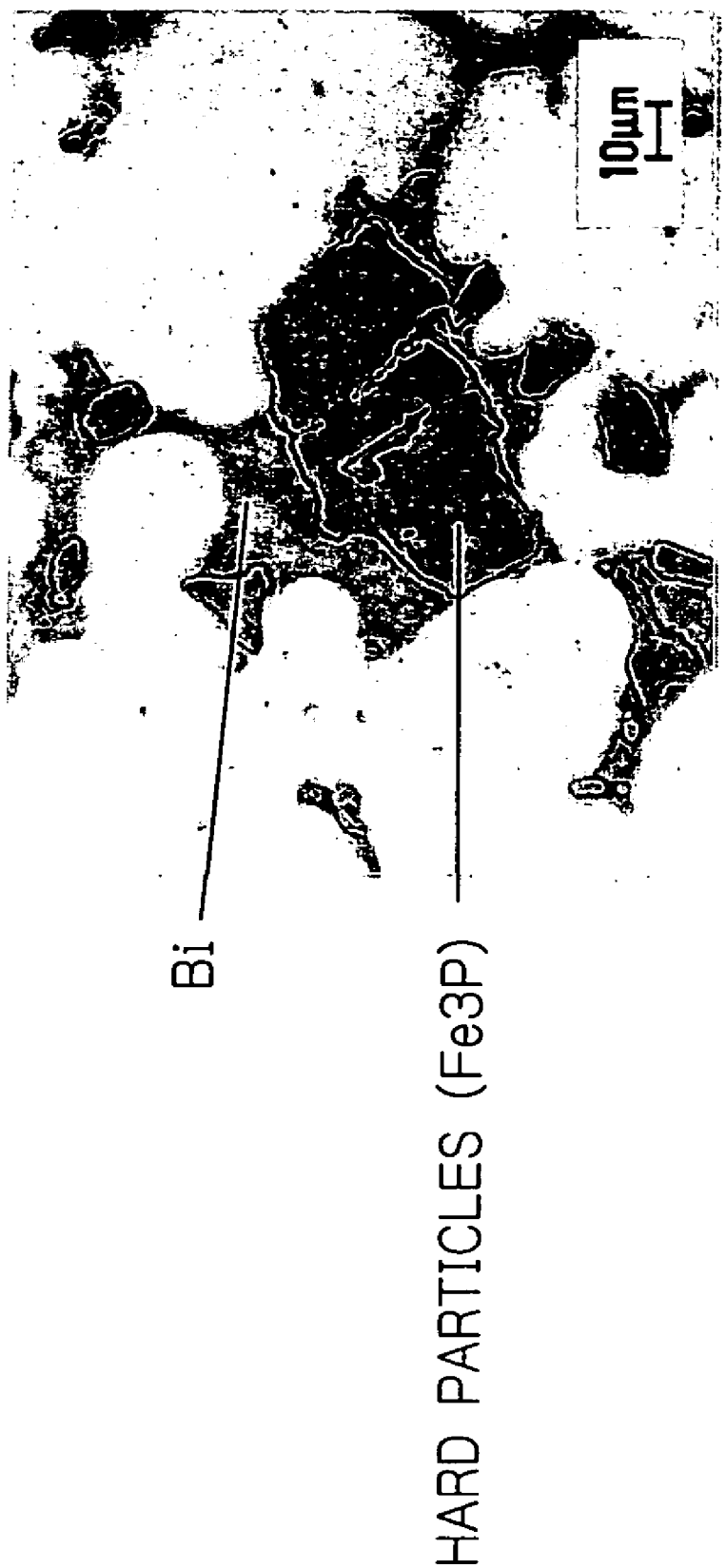

PB-FREE BEARING USED FOR FUEL-INJECTION PUMP

The invention claimed in the present application was made pursuant to a joint research agreement entered into between Taiho Kogyo Co., Ltd. and Denso Corporation.

BACKGROUND OF INVENTION

1. Field of Injection

The present invention relates to a bearing used for a fuel-injection pump, more particularly, a copper-based sintered alloy bearing free of Pb, having improved sliding properties.

2. Description of Related Art

A fuel injector of a diesel engine finely pulverizes the fuel and uniformly mixes it with air in sprayed state, and imparts to the fuel-air mixture the requisite pressure for injection. The fuel injector plays the role of injecting fuel into a combustion engine in appropriate injection amount and at appropriate injection time, which amount and time are dependent upon the load and rotation of the engine.

A fuel injection pump is usually driven by a crankshaft of an engine with the aid of a belt. Since the fuel injection pump is a cantilever construction, the belt tension imparts to the fuel injection pump a local load. Although the fuel of the engine lubricates the bearing, the sliding condition of the bearing is liable to be the boundary-lubricating condition because of the low viscosity of fuel and the local load. Material of the bearing should, therefore, be highly wear-resistant and seizure-resistant. Recently, attempts have been made to decrease the sulfur content of light-oil fuel used in a Diesel engine in the light of environmental protection. The lubrication property of the fuel decreases accordingly, and, therefore, the wear resistance becomes particularly important.

Conventionally, lead bronze has been frequently used for the bearing of a fuel injection pump. Its composition is for example 3.0% of Sn, 23.0% of Pb, 3.0% of Fe, 1.0% of P and the balance of Cu. Fe among these components precipitates as hard particles and contributes to enhance the wear resistance.

In order to highly atomize fuel, pressure of the fuel injector should be high. In the conventional fuel injector, since the pressure is dependent upon the revolution speed of the engine, high pressure is difficult to obtain at low revolution and high load of the engine. In addition, when the atomized fuel-spray generated under high pressure is burnt, NOx is formed in great amount and noise is seriously incurred. These drawbacks are mitigated by a recently developed fuel injector of the common-rail system, which generates further higher pressure. The outer-cam pressurizing fuel feeding system is employed in the fuel injector so as to cope with the high pressure. This system comprises such inner parts as a ring cam including a bearing, at its sliding portion. An example of the fuel injection pump is described with reference to FIG. 5.

Referring to FIG. 5, such parts of the fuel injection pump are shown: 1—eccentric cam, 2—bearing (bushing), 3—housing of a ring cam, 4—housing, 5—high-pressure valve, 6—plunger, 7—suction-control valve, 8—feeding pump, 9—cam shaft, 10—suction valve, and 11—connecting pipe. The bearing is subjected to reciprocating pressure of the fuel and its pressure on the surface of the bearing 2 is very high due to the pressure-increasing tendency as described hereinabove. In addition, since lubrication is attained by the fuel, the thickness of the oil film on the bearing is extremely thin. Since the bearing is used under such conditions, high level of wear resistance and seizure resistance are required in the bearing. A lead-containing bearing or a resin bearing is used at present for the bearing of a fuel injection pump.

Pre-lecture Paper of Tribology Conference of Tribology Institute of Japan (Tokyo 2003-5) publishes research on the sulfurizing-resistant bearing material used for the fuel pump. This research proposes to add 0.4 wt % of P and from 2 to 5% of C to the Cu—Ni—Zn based material. Mainly, the sulfurizing resistance in the high-sulfur gasoline is tested. The graphite (C) added to the sintered material makes this material to be a complex structure of the graphite and metallic copper alloy and imparts low-friction property. Therefore, lead (Pb), which is environmental pollutant, can be avoided.

The bushing used in the fuel injection pump is exposed to more severe boundary-lubrication condition as compared with the general bushing. The wear resistance, seizure resistance, corrosion-resistance and the like required for the former bushing is at higher level than those of the latter. Therefore, lead bronze has been used for the bushing of a fuel injection pump. Lead (Pb) added to the copper alloy for the sliding material expands and is deforms in the sliding direction on the sliding surface, upon temperature rise during the sliding. Lead (Pb), therefore, cools the sliding surface, and prevents seizure due to its excellent self lubricating property. Since lead (Pb) forms a soft dispersion phase in the copper alloy, lead has compatibility and foreign matters are embedded in the lead phase.

Nevertheless, lead (Pb) is liable to be corroded by acid except sulfuric acid. When lead is present in the Cu alloy in the form of coarse particles, the load ability of the bearing lowers. Japanese Examined Patent Publication (kokoku) No. 8-19945 (hereinafter referred to as "the patent document 1") proposes dispersion of fine lead particles expressed in a particular calculating formula. The total lead (Pb) particles are observed in the field of 0.1 mm$^2$ ($10^5$ μm$^2$, i.e. $S_t$, to obtain their number (N) and area ($S_p$) in 1 m$^2$. The proposed formula of $S_p/S_t/N$ is construed to be ratio of 0.1% or less. In an example of this publication, a Cu—Pb—Sn pre-alloy powder is used. It is also described that the fine Pb structure is likely to be obtained at lower sintering temperature. It is, therefore, understood that the precipitation and growth of Pb are suppressed by means of low-temperature sintering.

It is known from Japanese Unexamined Patent Publication (kokoku) No. 7-9046 (hereinafter referred to as "the patent document 2") that such carbides as $Cr_2C_3$, $Mo_2C$, WC, VC and NbC are added as hard particles to enhance the wear resistance of the sintered copper alloy. In this patent document, the copper-alloy powder having from 10 to 100 μm of average particle diameter and the hard particle powder having from 5 to 150 μm of average particle diameter are mixed in a V-type blender, and compacted and sintered. It is described that lead (Pb) is present at the grain boundaries of copper-alloy particles (column 4, lines 21-22). This description is not contradictory to the knowledge from an equilibrium phase-diagram, that is, virtually no solution of Pb in the solid Cu.

Japanese Unexamined Patent Publication (kokoku) No. 10-330868 (hereinafter referred to as "the patent document 3") proposes a Pb-free alloy which attains the sliding properties as high as that of the sintered Cu—Pb alloy. A drawing of this publication shows that Bi is present on the grain-boundary triple points and the grain boundaries in the vicinity of the triple points.

Japanese Patent No. 3,421,724 (hereinafter referred to as "the patent document 4") proposes the following sintered copper alloy. That is, the hard particles are present in and mixed with the Pb or Bi phase. This phase is not separated from sintered alloy, even if Pb and Bi become flowable upon temperature rise. The Pb and Bi phase behaves as a cushion of the hard particles, so that when the hard particles and the opposite shaft are brought into sliding contact with one another, the hard particles are forced into the Pb or Bi phase. The aggressive properties of the hard particles are, therefore, mitigated. When the hard particles are separated from the Pb or Bi phase, they are again captured by the Pb or Bi phase. The abrasive wear due to the separated hard particles is, therefore, mitigated. Since the hard particles are enveloped in the Bi phase, the size of the Bi phase is greater than that of the hard particles.

Japanese Unexamined Patent Publication (kokai) No. 2001-220630 (hereinafter referred to as "the patent document 5") proposes the following Cu—Bi(Pb) based sintered alloy, particularly a structure of the alloy, wherein the intermetallic-compound particles are present around the Bi or Pb phase. When the sintered alloy is subjected to sliding, the Bi or Pb phase and Cu alloy primarily wear out, while the intermetallic compound particles remain on the surface and protrude on the surface of sintered alloy. The concave Bi or Pb phase and Cu alloy act as oil reserving portions. As a result, the wear resistance and fatigue resistance are improved. An example of the sintering conditions is 800-920° C. for approximately 15 minutes.

The conventional Pb-free materials used for the bearing of a fuel injection pump cannot attain the sliding properties the same as or higher than that of the conventional Pb-containing materials. Problems of the above described prior art are described hereinafter.

Pb and Bi contained in the Cu alloy forms a separate phase from the Cu matrix, because Pb and Bi are virtually not dissolved in the solid Cu, and they do not form intermetallic compounds. Such structure and properties of Pb and Bi are utilized in the conventional copper alloys as a compatibile property. Meanwhile, Pb and Bi are of low strength, and the fatigue strength is lowered. Therefore, the low-temperature sintering and formation of the fine Pb phase proposed in the patent document 1 is effective for mitigating the drawbacks mentioned above. However, the low temperature at sintering detrimentally lowers the bonding strength of the copper alloy particles.

The Bi phase of the Cu—Bi based alloys proposed by the patent documents 3, 4 and 5 exudes on the surface of the alloys or corrodes, when the alloys are used at high temperature or in deteriorated oil. The amount of Bi of the Cu—Bi based alloys used becomes less than the added amount, with the result that the sliding properties are impaired. Bismuth (Bi) may also be dissolved in the lubricating oil. When the Bi phase is finely dispersed, the volume of each Bi particle is so small that the exudation and decrease in the Bi content can be prevented. However, the fine dispersion of Bi and high post-sintering strength of copper alloys are contradictory phenomena.

The Bi phase of the Bi-containing Cu alloys of the patent documents 4 and 5 is converted to liquid during sintering. The components of the Cu matrix are, therefore, liable to diffuse into the liquid Bi phase. Intermetallic compounds are, therefore, formed in the liquid phase. Since the resultant intermetallic compounds are always present in the boundary of the Bi phase and Cu matrix, the intermetallic compounds outside the Cu phase cannot be held by the Cu phase.

Since the desired structure of the sintered alloy according to the patent document 5 cannot be obtained by ordinary sintering, the sintering is carried out for a long period of time. In this case, the size of the Bi phase becomes greater than the size of the hard particles. FIG. 2 of the patent document 4 suggests such growth of the Bi phase. It appears that the hard-particle contact ratio described hereinafter is almost 100% in the patent document 4. As shown in FIG. 1 of the patent document No. 5, the hard-particle contact proportion is high in this patent document. As is described hereinabove, the Bi phase of the prior art is one of the reasons for the lowering the fatigue resistance and the corrosion resistance.

SUMMARY OF INVENTION

It is an object of the present invention to provide a Cu—Bi based alloy, which can simultaneously attain a high level of the compatibility, fatigue resistance and corrosion resistance required for the bearing of a fuel injection pump.

In accordance with the objects of the present invention, there is provided a lead-free bearing, which contains from 1 to 30 mass % of Bi and from 0.1 to 10 mass % of hard particles having from 10 to 50 μm of the average particle diameter, the balance being Cu and unavoidable impurities, and further the Bi phase dispersed in the Cu matrix has average particle diameter smaller than that of the hard particles.

There is also provided a lead-free bearing, which contains from 1 to 30 mass % of Bi and from 0.1 to 10 mass % of hard particles having from 10 to 50 μm of average particle diameter, the balance being Cu and unavoidable impurities, and which includes a Bi phase in contact with a portion of the hard particles, the contact length of which with the Bi phase being 50% or less relative to the total circumference length of the hard particle, the number of said portion of the hard particles being 70% or more of the total hard particles.

The present invention is described hereinafter in detail.

(1) Alloy Composition

In the sintered Cu—Bi based alloy according to the present invention, the Bi content is from 1 to 30 mass %, because the seizure resistance is poor at Bi content less than 1 mass %, and, further, the strength is low and the fatigue resistance is poor at Bi content more than 30 mass %. Preferred Bi content is from 1 to 15 mass %.

The hard particles herein may be those proposed in the patent document 2. An Fe-based compound having excellent sintering property with the copper alloy, such as $Fe_2P$, $Fe_3P$, FeB, $Fe_2B$, and $Fe_3B$, is preferably used. In addition, since the Fe-based compound has poor wettability with the bismuth (Bi) and good wettability with copper (Cu), the contact proportion between the Bi phase and the hard particles is low after sintering. In addition, the hard particles are likely to be held by the Cu matrix. The separation of the hard particles and crack formation in the hard particles, which results in deterioration of the wear resistance and seizure resistance, are, therefore, difficult to occur during sliding. When the content of the hard particles is less than 0.1 mass %, the seizure resistance and the wear resistance are poor. On the other hand, when the content of the hard particles is more than 10 mass %, the strength and the fatigue resistance are lowered. In addition, the opposite material is liable to be attacked by the hard particles, and the sintering property is also impaired. Preferred content of the hard particles is from 1 to 5 mass %.

The balance of the above components is Cu and unavoidable impurities. The impurities, including Pb are ordinary ones.

If necessary, an additive element(s) may be added to the copper alloy. For example, phosphorus (P), which lowers the melting point of the copper alloy and improves the sintering properties, may be added up to 0.5 mass %. When the phosphorus (P) content is more than 0.5 mass %, the copper alloy embrittles. Tin (Sn), which enhances the strength and fatigue resistance, may be added within a range of from 1 to 15 mass %. When the Sn content is less than 1 mass %, the strength is not enhanced satisfactorily. On the other hand, when the Sn content is more than 15 mass %, intermetallic compounds are liable to form and the alloy embrittles. Nickel (Ni), which enhances the strength and the corrosion resistance, may be added within a range of from 0.1 to 5 mass %. When the nickel (Ni) content is less than 0.1 mass %, the strength does not increase satisfactorily. On the other hand, when the nickel (Ni) content is more than 5 mass %, intermetallic compounds are liable to form and the alloy embrittles. These elements are alloyed in Cu and are constitutional elements of the copper-alloy matrix.

Further, a solid lubricant, such as $MoS_2$ and graphite may be added to the copper alloy. The solid lubricant is not alloyed with the copper alloy but is present in the copper alloy as a composite component. The solid lubricant may be added up to 5 mass %.

(2) Alloy Structure

In the first and second bearings according to the present invention, the average diameter of the hard particles is from 10 to 50 μm. When the average particle diameter is less than 10 μm, the hard particles are not effective to improve the wear resistance. On the other hand, when the particle diameter is more than 50 m, the strength of the sintered copper alloy is low. Preferred average diameter of the hard particles is from 15 to 30 μm.

The alloy structure according to the present invention is such that the flow of the Bi phase is suppressed as much as possible and hence the contact between the Bi phase and hard particles due to flow of the Bi phase is suppressed. This feature is defined in the first bearing according to the present invention as $D_{Bi} < D_H$. In this relationship, $D_{Bi}$ indicates average diameter of the Bi phase (i.e., a circle equivalent diameter of the Bi phase). $D_H$ indicates the average particle diameter of the hard particles.

The second bearing according to the present invention includes a Bi phase in contact with a portion of the hard particles, the contact length of which with the Bi phase being 50% or less relative to the total circumference length of the Bi phase, the number of said portion of the hard particles being 70% or more of the total hard particles.

The "contact length of a portion of the hard particles with the Bi phase relative to the total circumference length of the hard particle" is hereinafter referred to as "the hard-particle contact ratio". Note that the descriptions of the hard particles in the present paragraph relate to those in contact with the Bi phase, unless otherwise specified. When the hard-particle contact ratio is 100%, the entire circumference of one or more hard particles is in contact with the Bi phase. This contact state is realized with each of the hard particles. This state is nothing but that the hard particles are embedded or enclosed in the Bi phase. On the other hand, when the hard-particle contact ratio is less than 100% but more than 0%, the hard particles in contact with the Bi phase have necessarily a portion protruding outside the Bi phase. This portion is in contact with the copper alloy. In the present invention, the hard-particle contact ratio is 50% or less, because the contact between the hard particles and the matrix is decreased to be as small as possible. In this state, the respective properties of the hard particles and the copper matrix can be exhibited at high level.

The proportion of number of the hard particles having 50% or less of the hard particle contact ratio relative to the total hard particles, which may include those not in contact with the Bi phase, is referred to as the "hard particle ratio". When the hard particle ratio is 100%, all of the hard particles have 50% or less of the hard particle contact ratio. On the other hand, when the hard particle ratio is 0%, all of the hard particles have more than 50% of the hard particle contact ratio. In the present invention, the hard particle ratio is limited to 70% or more, because the Bi phase and hard particles, which are slightly in contact with one another, should be present in the alloy in a relatively large proportion. As a result, the respective properties of the Bi phase and the hard particles are exhibited satisfactorily.

In order to realize the sintering process as described hereinabove, the sintering temperature of Cu—Bi alloy atomized powder or Cu—Bi alloy mixture powder is held at sintering temperature for a short time of 2 minutes or shorter. Such sintering can be carried out by the high-frequency induction sintering proposed by one of the present applicants in Japanese Unexamined Patent Publication (kokai) 2002-12902 (patent document 6).

(3) Properties of Alloy

Generally speaking, the Bi phase of the copper-based sintered alloy according to the present invention exhibits compatibility. The hard particles are firmly held by the matrix of the copper-based sintered alloy according to the present invention and are not easily separated from the Cu matrix. The wear resistance and the seizure resistance are, therefore, improved. Furthermore, the strength and the fatigue resistance are improved.

(a) The Bi phase is finely dispersed in the entire sintered alloy. The material properties of the sintered alloy as a whole, i.e., the so-called bulk properties, are improved in the fatigue resistance, the corrosion resistance and the strength.

(b) Almost all of the hard particles are held by the Cu matrix or the Cu-alloy matrix. The sliding-surface properties of the sintered alloy are improved in the wear resistance.

(c) The Bi phase present on the sliding surface provides improved compatibility without use of Pb.

(d) The finely dispersed Bi phase provides improved non-adhesivity and seizure resistance.

(4) Production Method of Bushing

The Cu—Bi alloy is pulverized by an atomizing method. The resultant Cu—Bi powder is mixed with hard-particle powder and powder of the other metallic components. The components other than the hard-particle powder may be in the form of an alloy powder prepared by the atomizing method. The powder mixture is dispersed on a steel sheet to a uniform thickness and is subjected to the sintering for a short period of time described hereinafter. The sintered alloy layer is rolled, then followed by sintering for a short period of time. If necessary, the rolling is carried out again. The resultant sintered and rolled product is in the form of a bimetal, which is cut into a pre-determined shape. The cut sheet is bent into cylindrical form and is worked into a bushing.

The present invention is hereinafter described with reference to drawings and examples.

BRIEF DESCRIPTION OF DRAWINGS

FIG. 4 is a photograph showing the microstructure of sintered copper alloy according to a comparative example of the present invention (500 of magnification).

EXAMPLES

The Cu—Bi alloy powder, the composition of which is shown in Table 1 (the atomized powder, 150 μm or less of the average particle diameter) and the hard-particle powder (the average particle diameter is shown in Table 1) were mixed and sprayed on a steel sheet to a thickness of approximately 1 mm. The primary sintering was carried out at 750~1000° C. for 20~1800 seconds in the hydrogen reducing gas. The rolling was subsequently carried out. The secondary sintering was carried out under the same conditions as the primary sintering. The resultant sintered materials were used as the test materials. The sintering for a long period of time within the range of the above mentioned sintering time promotes the diffusion of the Bi phase and hence to prepare comparative samples.

Testing Method of Seizure Resistance

The surface of the copper alloys prepared by the above mentioned method was lapped by abrasive paper to adjust the surface roughness (ten-point average roughness) to 1.0 g m or less. A steel ball was abutted on the so-prepared surface and was caused to slide into one direction under load. The surface of the steel ball was then observed to measure the surface area of Cu alloy adhered on the steel ball. Since the easily adhered material has poor seizure resistance, the small adhesion area indicates improved seizure resistance.

Tester: Stick Slip Tester
Load: 500 g
Material of Shaft: Bearing Steel (SUJ2)
Lubricating Oil: none
Temperature: gradual increase from room temperature to 200° C.

Testing Method of Fatigue Resistance

The fatigue strength and tensile strength show good co-relationship with one another. Improved fatigue strength is, therefore, attained at high tensile strength. The tensile strength test stipulated in JIS was carried out to measure the tensile strength of the Cu—Bi alloys and was used as an alternative property.

The above properties and the hard particle ratio are shown in Table 1.

As is clear from Table 1, the inventive examples exhibit high level of improved seizure resistance, fatigue resistance and corrosion resistance.

Figure 1:
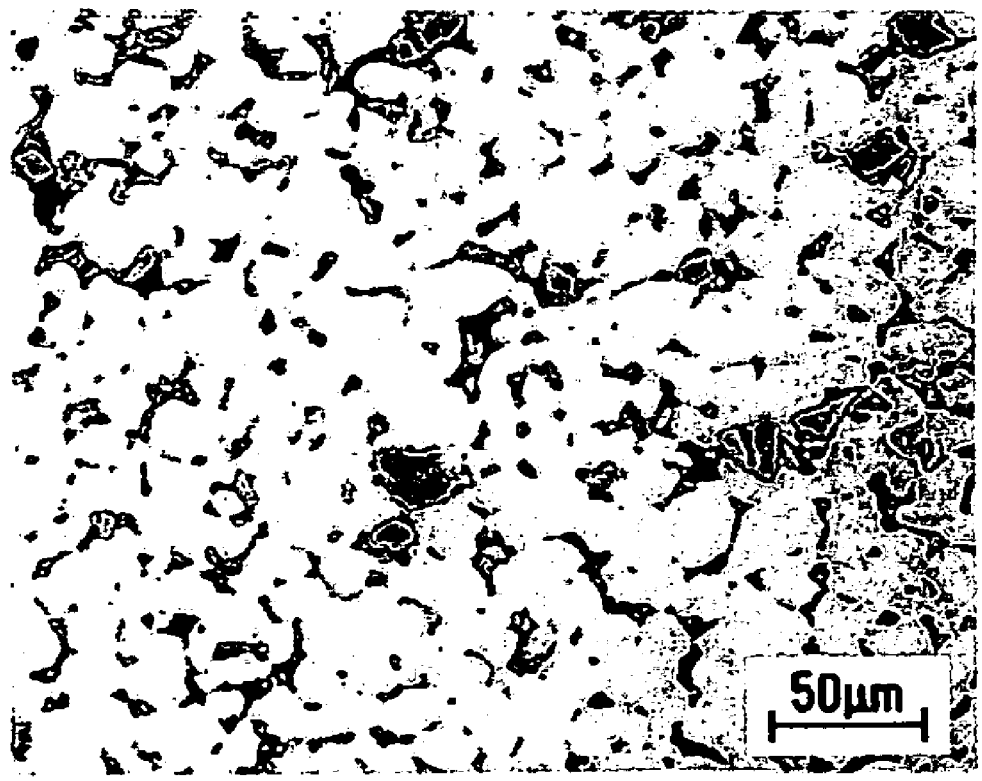
FIG. 1 is a photograph showing the microstructure of sintered copper alloy according to an example of the present invention (200 of magnification).
Figure 2:
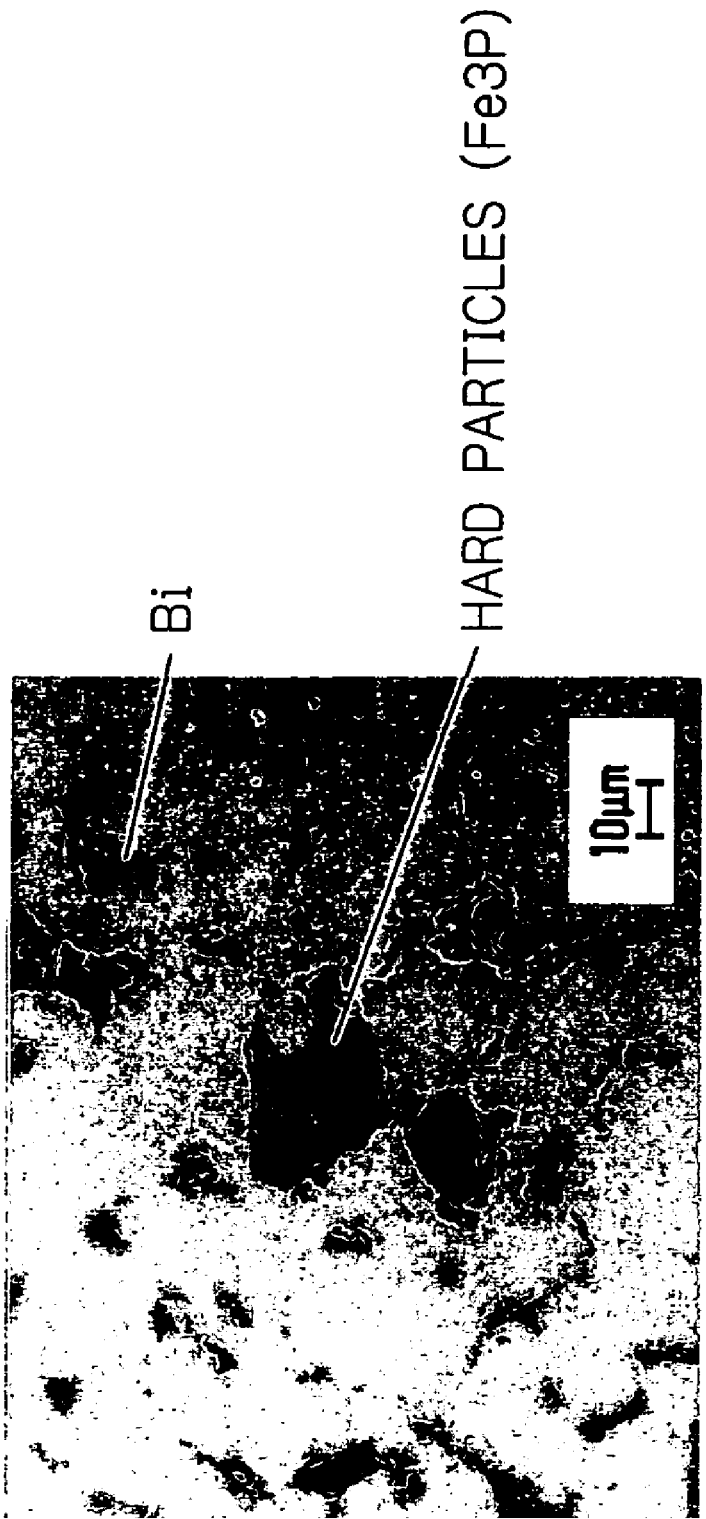
FIG. 2 is a photograph showing the microstructure of sintered copper alloy according to another example of the present invention (500 of magnification).
Figure 3:
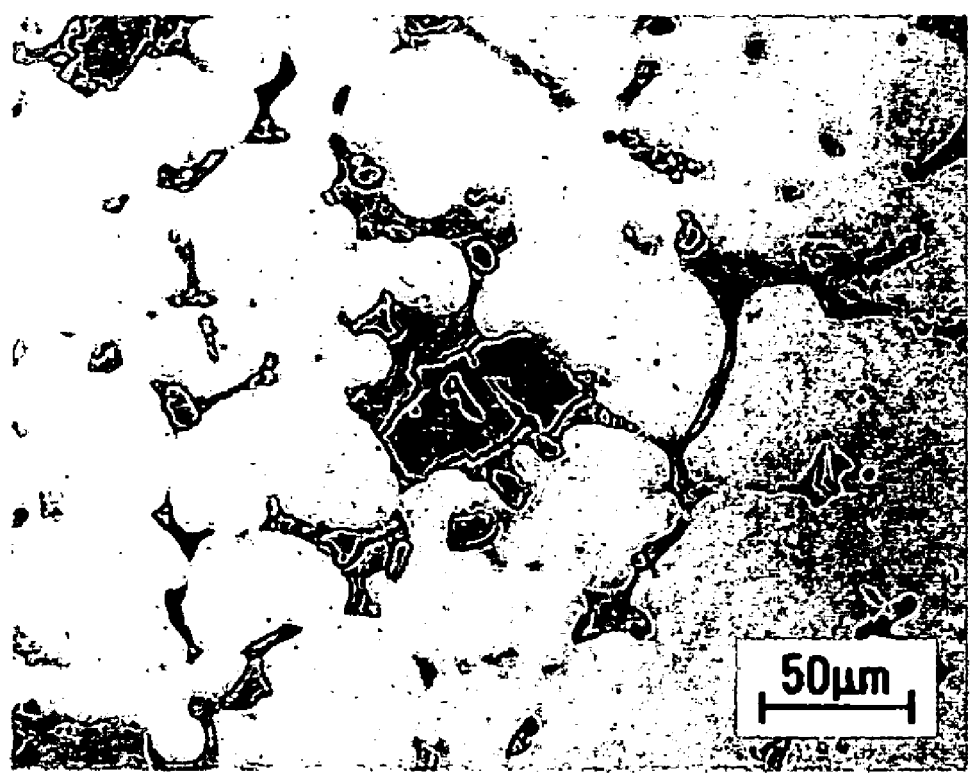
FIG. 3 is a photograph showing the microstructure of sintered copper alloy according to a comparative example of the present invention (200 of magnification).
Figure 5A:
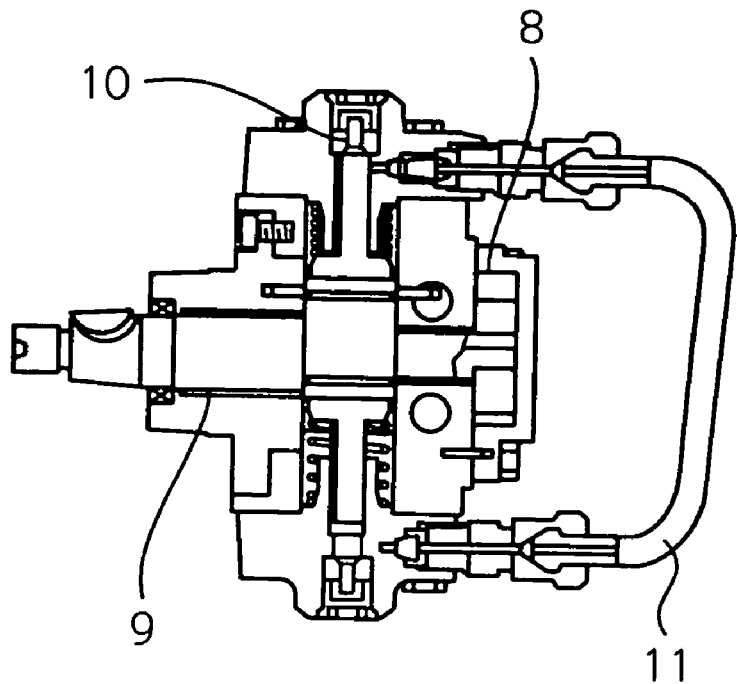
FIGS. 5(a) and (b) shows an example of a fuel injection pump.
Figure 5B:
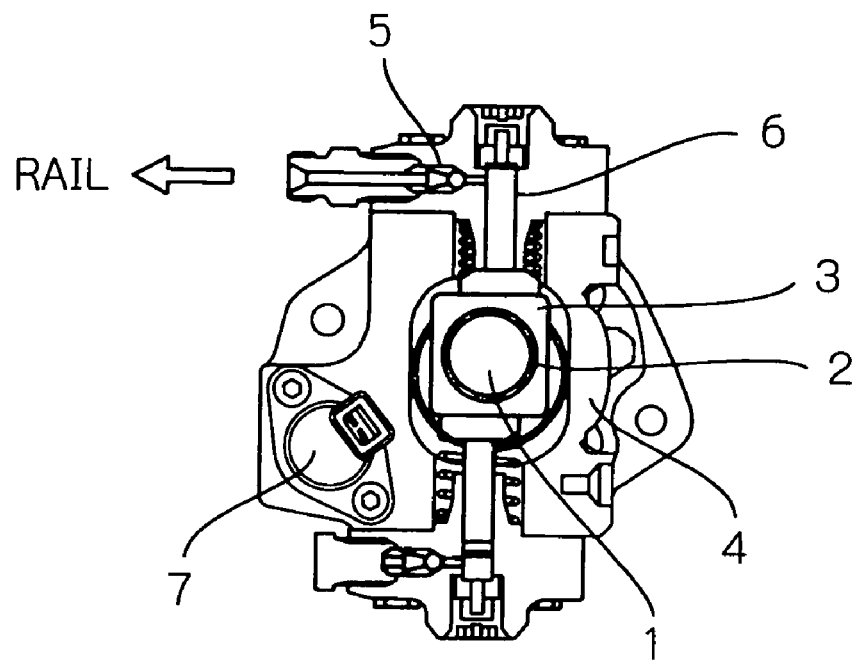

Microscopic photograph of the inventive example No. 4 is shown in FIGS. 1 and 2, at magnification of 200 and 500, respectively. Microscopic photograph of the comparative example No. 3 is shown in FIGS. 3 and 4, at magnification of 200 and 500, respectively. In the former photographs of FIGS. 1 and 2, the contact between the hard particles and the Bi phase is in lower proportion than that in the latter photographs of FIGS. 3 and 4.

In FIGS. 1 through 4, the circle of a Bi phase indicates a circle which surrounds a Bi phase, appearing like one irregularly shaped particle, and which is in contact with the largest periphery of such Bi phase.

Example 2

Comparative material No. 4 and inventive material No. 6 shown in Table 1 were bent into a cylindrical form and worked as a bushing. This was mounted in a fuel injection pump of a diesel engine and a durability test was carried out using light oil corresponding to JIS second class as the lubricating oil. No damage or failure occurred with the case of the inventive material No. 6 during the test period of 1,000 hours.

INDUSTRIAL APPICABIITY

As is described hereinabove, the bearing of a fuel injection pump according to the present invention is free of Pb but exhibits improved seizure resistance and fatigue resistance. The bearing is therefore appropriate to be operated in a pump under high pressure

The invention claimed is:

1. A lead-free bearing suitable for use in a fuel injection pump, which comprising:
    from 1 to 30 mass % of Bi; and
    from 0.1 to 10 mass % of hard particles having from 10 to 50 μm of average particle diameter; and
    the balance being Cu and unavoidable impurities, wherein Cu constitutes a Cu matrix,

|   | Bi Content (mass %) | Diameter of circle corresponding to Bi phase (μm) | Hard Particle (mass %) | | | Average Diameter of Hard-Particle (μm) | Hard-Material Ratio (%) | Seizure Resistance Adhesion Surface (μm²) | Fatigue Resistance Material Strength (MPa) |
|---|---|---|---|---|---|---|---|---|---|
|   |   |   | Fe₃P | Fe₂P | FeB |   |   |   |   |
| 1 | 3 | 5 | 2 | 1 | — | 15 | 89 | 12 | 264 |
| 2 | 5 | 5 | 3 | 2 | — | 25 | 94 | 15 | 257 |
| 3 | 5 | 8 | 4 | — | — | 25 | 91 | 11 | 262 |
| 4 | 10 | 7 | 2 | 1 | — | 15 | 92 | 12 | 252 |
| 5 | 10 | 12 | 4 | — | — | 25 | 86 | 8 | 230 |
| 6 | 10 | 14 | 4 | 1 | — | 25 | 89 | 8 | 225 |
| 7 | 10 | 18 | — | — | 5 | 24 | 84 | 6 | 220 |
| 8 | 15 | 8 | 2 | — | — | 15 | 93 | 0 | 238 |
| 9 | 15 | 17 | 2 | 3 | — | 25 | 91 | 0 | 214 |
| 10 | 15 | 14 | — | — | 4 | 24 | 92 | 0 | 228 |
| 11 | 15 | 13 | — | 3 | — | 25 | 91 | 0 | 232 |
| 12 | 20 | 22 | 3 | 2 | — | 25 | 88 | 0 | 198 |
| 13 | 20 | 28 | 7 | 3 | — | 32 | 86 | 0 | 176 |
| 1 | — | — | — | — | — | — | — | 100 | 348 |
| 2 | 5 | 31 | 5 | — | — | 25 | 55 | 12 | 184 |
| 3 | 10 | 52 | 3 | — | — | 25 | 32 | 25 | 175 |
| 4 | 10 | 105 | 3 | 2 | — | 25 | 18 | 50 | 152 |
| 5 | 15 | 68 | 2 | 1 | — | 25 | 25 | 50 | 145 |
| 6 | 20 | 127 | 5 | — | — | 25 | 12 | 50 | 123 |

Bi constitutes a Bi phase being dispersed in the Cu matrix, and

70% or more of the total number of the hard particles contact with the Bi phase in such a manner that the contact length of the hard particles with the Bi phases is 50% or less relative to the total circumference length of the hard particle.

2. The lead-free bearing suitable for use in a fuel injection pump according to claim 1, wherein it further contains at least one element selected from the group consisting of from 1 to 15 mass % of Sn, from 0.1 to 5 mass % of Ni and not more than 0.5% of P.

3. The lead-free bearing suitable for use in a fuel injection pump according to claim 1, wherein said hard-particles consists of Fe compound, selected from as $Fe_2P$, $Fe_3P$, $FeB$, $Fe_2B$, and $Fe_3B$.

4. The lead-free bearing suitable for use in a fuel injection pump according to claim 1, wherein, $D_{Bi}$ is smaller than $D_H$, where $D_{Bi}$ is diameter of the Bi phase and $D_H$ is diameter of the hard particle.

5. The lead-free bearing suitable for use in a fuel injection pump according to claim 1, wherein said bearing is produced by process comprising: mixing a copper-alloy powder containing from 1 to 30 mass % of Bi, the balance being Cu and inevitable impurities and having 150 μm or less of particle diameter, and from 0.1 to 10 mass % of hard particles having from 10 to 50 μm of average diameter; and, sintering the mixture at a temperature of 750 to 1000° C.

6. The lead-free bearing suitable for use in a fuel injection pump according to claim 5, wherein the copper-alloy powder is atomized powder.

7. The lead-free bearing suitable for use in a fuel injection pump according to claim 6, wherein a sintering time is from 20 seconds to shorter than 2 minutes.

8. The lead-free bearing suitable for use in a fuel injection pump according to claim 5, wherein the mixture is sintered in a high-frequency induction furnace.

9. The lead-free bearing suitable for use in a fuel injection pump according to claim 5, wherein the copper-alloy contains at least one element selected from the group consisting from 1 to 15 mass% of Sn, from 0.1 to 5mass % of Ni and not more than 0.5% of P.

10. the lead-free bearing suitable for use in a fuel injection pump according to claim 5, wherein the hard particles consists of Fe compound, selected from $Fe_2P$, $Fe_3P$, $FeB$, and $Fe_3B$.

* * * * *